Patented Jan. 7, 1936

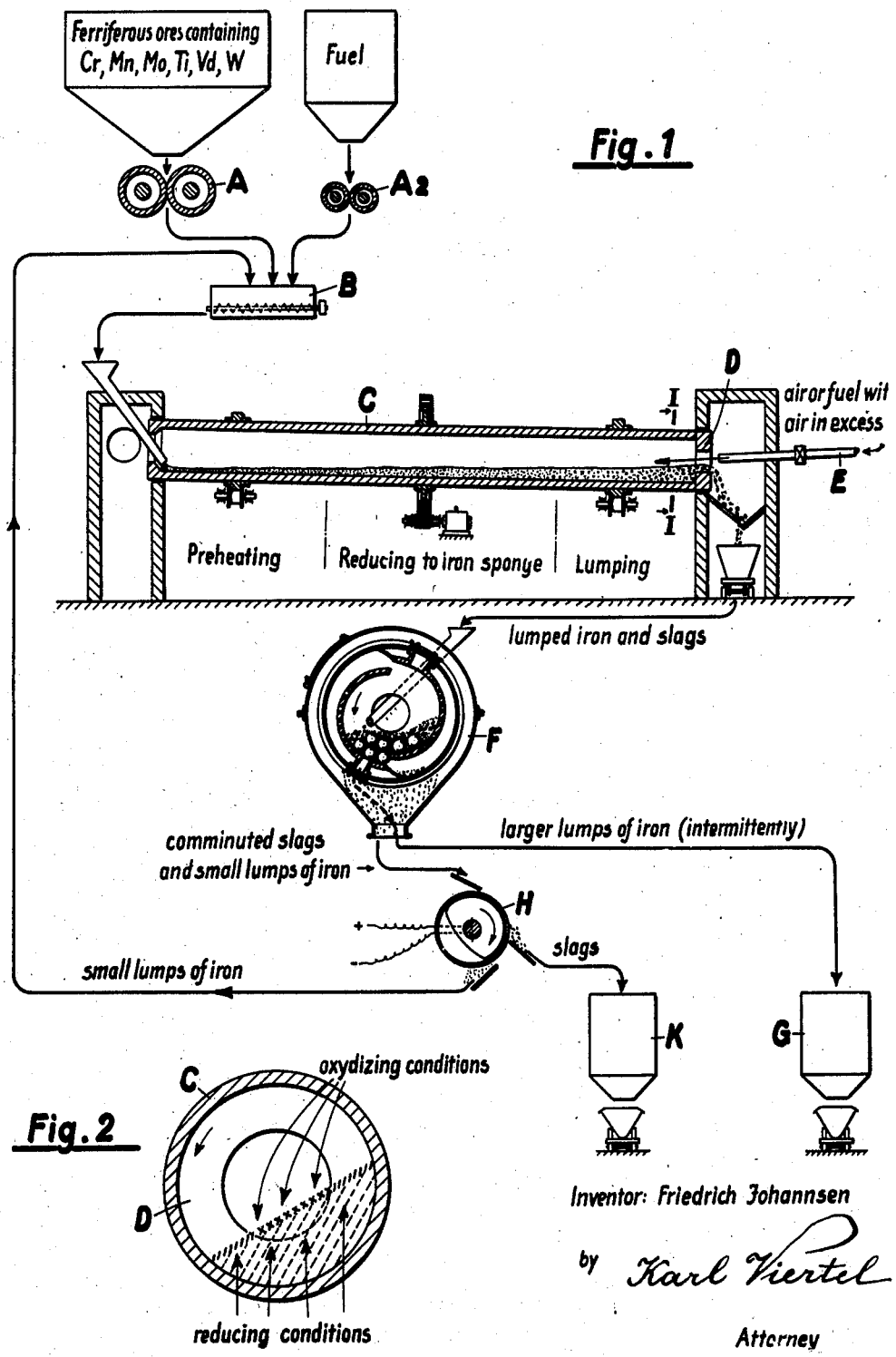

2,026,683

UNITED STATES PATENT OFFICE 2,026,683

TREATING FERRIFEROUS ORES

Friedrich Johannsen, Magdeburg, Germany, assignor to firm Fried. Krupp Grusonwerk Aktiengesellschaft, Magdeburg-Buckau, Germany Application April 19, 1935, Serial No. 17,305
In Germany May 22, 1934

1 Claim. (Cl. 75—14)

My invention relates in its broad aspects to a metallurgical and economical problem existing in countries like Germany, where amongst others the following metals: chromium, manganese, molybdenum, titanium, tungsten and vanadium, i. e. certain ironlike elements, hereinafter briefly called "companion metals", which are required for alloying iron and producing high duty steels—distinct by their increased hardness, resistance against corrosion, toughness, ductility, high elastic limit and many other valuable properties,—are scarce; namely because natural deposits (mines) of minerals rich in said metals do not exist, but only a limited supply of iron ores is at hand containing said companion metals, and because the iron content of said ores is so high, that by reduction in the blast furnace only an alloy rich in iron but poor in said companion metals is obtained.

In view of these facts the invention relates more specifically to the problem of separating effectively and under conditions of economy the aforesaid companion metals chromium, manganese, molybdenum etc. from the iron content of ores containing said companion metals beside iron.

With the object of separating companion metal compounds of the aforesaid kind from the iron compounds various metallurgical processes have been proposed:—

One of them consists in treating the finely subdivided raw material in the presence of solid or gaseous reducing agents in a metallurgical furnace and at temperatures, at which the iron alone is reduced to iron sponge, while the companion metal remains in its oxidic form, whereafter the charge is cooled down, finely comminuted and subjected to an electromagnetic separation treatment.

In practice however it has been found, that the said electromagnetic treatment is of little avail in as much as the reduced material and the oxidic substances—even being very finely comminuted—will not sufficiently separate from each other; I attribute this occurrence to the fact, that the iron compounds in the crude ore are very intimately associated with the compounds of the companion metal concerned, and I assume, that even by the conversion of the iron into iron-sponge the said intimate association cannot be interrupted or dissolved.

It has been further proposed to eliminate the drawbacks of the aforedescribed metallurgical treatment—after having converted by a reducing process the ferriferous ores into sponge iron—by completely fusing and melting down the charge so as to separate from each other in liquid condition and by reason of their different temperatures of reduction the basic metal iron and the non-reduced companion metal remaining in the slags concurrently produced.

Practical experiments however have revealed the fact, that the slags obtained in the course of such a melting process do contain only a portion of the companion metal, and that a considerable proportion of the latter goes into the molten iron. I attribute this insufficient separation of the metals concerned to the fact, that the fusing of the reduced iron takes place at such a temperature, that also a considerable proportion of the companion metal is concurrently reduced and passes over into the bath of molten iron.

The principal object of this invention is to overcome the disadvantages inherent to known metallurgical operations by providing an improved treatment for ferriferous raw materials of the composition described, by which said companion metals chromium, manganese, etc. can be separated and reclaimed in an effective and economical manner.

The invention further aims at so controlling and carrying out in practice the improved process, that the companion metals are obtained in a condition ready for the production of iron alloys having a high content of the said companion metals, such as ferromanganese, chromic iron, ferro-vanadium, ferrotungsten, etc.

Still other objects of the invention will become incidentally apparent hereinafter to practitioners in this art.

The nature and scope of this invention are briefly outlined in the appended claim and will be more fully understood from the following specification taken together with the accompanying drawing, in Fig. 1 of which there is diagrammatically shown, how the process forming the subject of this invention may be carried out to advantage in practice. Fig. 2 is a cross section on line I—I in Fig. 1.

According to this invention the improved process of reclaiming from ferriferous ores and metallurgical products ironlike companion metals or metal compounds, which are reducible only at a higher temperature than iron,—essentially comprises: Causing a charge of the comminuted raw material, mixed with reducing agents, to pass through a metallurgical furnace, agitating the charge therein and preheating it up to temperatures, ranging from about 600–900 centigrade, at which the iron compounds of the material are converted into iron sponge, causing the charge to be further heated up to temperatures ranging from about 900–1400 centigrade, at which, while the companion metal compounds remain unreduced, the sponge iron is about to lump,—causing a current of oxidizing gases to react with the preheated charge, whereby a proportion of iron of the sponge is burnt and additional heat is produced, sufficient for accomplishing the lumping of the iron of the sponge and for producing from the iron oxides and the slag forming constituents of the ore, which are fluxible by iron oxide, slags containing the companion metal compounds and iron oxides and being sufficiently liquid as to separate from the lumping iron, and causing said slags and lumped iron to jointly leave the furnace and to be subsequently separated from each other.

How the said reducing and lumping process has been carried out in the course of my experiments in an advantageous and particularly economical manner as regards fuel consumption and clean separation of the iron from the companion metal compounds will now be described with reference to Figs. 1 and 2 of the drawing.

The ferriferous ores, which may be assumed to contain 10% manganese are comminuted to a size of about 10 mm. by crushing rollers A. By another set of crushing rollers A2 the reducing agent such as waste coke is comminuted to about the same size as the ore; the crushed materials are mixed thereafter in a mixing drum B and are fed into a rotary tubular furnace C.

The latter is provided at its exit with means E for introducing thereinto additional reaction agents, namely air or fuel carrying with it air in excess, and with means for stowing up the charge to a relatively thick layer, viz. thicker than at the rest of the furnace, for instance with a baffle ring D having a relatively narrow central aperture.

As indicated in Fig. 1 the charge in passing through the furnace is preheated up to a temperature of about 600 centigrade, when the reduction of the iron oxides sets in; the reduction into iron sponge is accomplished in the reduction zone proper at temperatures ranging from 600–900 centigrade, whereafter the charge—then containing iron sponge mixed with still unreduced compounds of the companion metal—passes through the lumping zone and thence out of the furnace.

In the lumping zone, where the charge is stowed up to a relatively thick layer, a small proportion of the iron sponge is converted into ferrous oxides by a current of air introduced at E and impinging on the central section of the charge with the result, that a small proportion of the iron is burnt and the temperature at the surface of the charge is locally raised to an extent, where—from the ferrous oxides, the slag forming impurities of the sponge, such as silicic acid, magnesia, lime, alumina, and the non-reduced compounds of the companion-metal—slags are formed sufficiently liquid as to separate from the iron and to cause the particles of the latter to weld together into compact lumps.

It will be noted, that the aforesaid slags contain in statu nascendi amongst other substances ferrous oxides, which however are in fact ballast matter in as much as the specific content of the companion metal of the slags is correspondingly reduced.

I have succeeded in eliminating the said drawback in analogy to the teaching of my United States Patent 1,964,917 by carrying out the lumping process in such a manner, that the said ferrous oxides are re-reduced in the same cycle of reactions:—

As indicated in Fig. 2 of the drawing, showing a cross section through the lumping zone of the furnace, while the charge passes therethrough, the ferrous oxides of the slags—because of the rotary and trundling motion of the charge and the thickness of the layer of the charge in said zone—are repeatedly carried through places, where reducing conditions exist, and are thereby re-converted into metallic iron.

Compact lumps of relatively pure iron are thus obtained, which are embedded in slags, the latter being relatively poor in iron but containing practically all the bulk of the companion metal concerned, which is then still in unreduced condition.

As diagrammatically indicated in Fig. 1 the slags may be conveniently separated from the lumped iron by a two-step separating treatment, which comprises:

First: Cooling down by currents of air or irrigation with water the hot mass discharged from the rotary furnace C, feeding the mass into a ball mill F provided with sieves, through which the comminuted slags jointly with small lumps of iron are continuously discharged, while the larger lumps of iron, which on account of their greater resistance remain practically intact are discharged at intervals and collected at G, whereafter they may be subjected to an appropriate refining process;

Secondly: Subjecting the comminuted slags and small lumps of iron incorporated therein to a preferably electro-magnetic separation treatment at H, whereafter the slags are collected at K, while the small lumps of iron are returned into the mixing drum B, as indicated by lead lines and arrows, and pass therefrom into the furnace C.

In the course of my experiments I have succeeded in reclaiming from poor iron ores containing besides gangues 15–18% Fe and 10–12% manganese the said companion metal Mn by the above described treatment, in which a rotary tubular furnace 1,0 meter in diameter and 8,0 meters in length was used, and which was provided at its discharge end with a baffle ring having an aperture 0.32 m. wide.

There were treated daily about 2,5 tons of said iron ores, to which 20% waste coke was added; the total time of travel of the charge through the furnace was about 6–8 hours.

On analyzing the products obtained the following figures were ascertained: Mn content of the slags 22–25%, Fe content of the slags 2–4%, Mn content of the lumped iron 0,1–0,4%.

On account of their high Mn-content the slags were in a condition to be directly converted by a subsequent reducing process into a high grade ferromanganese product.

The most essential feature of the improved treatment lies in the fact, that the temperatures within the furnace are so controlled, that the iron instead of melting is welded together into lumps, while the compounds of the companion metal remain unreduced and are incorporated in the slags produced during the lumping process.

In view of the fact, that the compounds of some of the companion-metals concerned, viz. molybdenum, titanium, tungsten and vanadium on being recovered from the slags by thermic reduction require an extraordinarily high amount of heat and extremely high temperatures, a non-thermic process may be appropriately used, which comprises adding alkaline substances to the charge before passing the latter through the furnace and thus eventually converting the oxides of the companion metal incorporated in the slags into soluble compounds, which can be extracted by a subsequent leaching process.

What I claim is:—

Process of reclaiming from ferriferous raw materials ironlike companion metals reducible at higher temperatures than iron, which comprises causing a charge of the raw materials, mixed with reducing agents, to pass through a metallurgical furnace, agitating the charge therein and preheating it up to temperatures, at which the iron compounds of the material are converted into iron sponge—ranging from 600-900 centigrade, causing the charge to be further preheated up to temperatures, ranging from about 900-1400 centigrade, at which—while the companion metal compounds remain unreduced—the sponge iron is about to lump,—causing a current of oxidizing gases to react with the preheated charge, whereby a proportion of iron of the sponge is burnt and additional heat is produced, sufficient for accomplishing the lumping of the iron of the sponge and for producing from the iron oxides and the slag forming constituents of the ore, which are fluxible by iron oxide, slags containing the companion metal compounds and iron oxides and being sufficiently liquid as to separate from the lumping iron, causing the iron oxides of said slags to be re-converted into lumped iron, while the companion metal compounds remain therein unreduced, and causing said slags and lumped iron to jointly leave the furnace and to be subsequently separated from each other.

FRIEDRICH JOHANNSEN.